(12) United States Patent
Peng et al.

(10) Patent No.: US 8,599,574 B2
(45) Date of Patent: Dec. 3, 2013

(54) DISPLAY UNIT HAVING ANTI-EMI CAPABILITY

(75) Inventors: Ke-Hui Peng, Shenzhen (CN); Xue-Dong Tang, Shenzhen (CN); Ren-Wen Wang, Shenzhen (CN); Ping Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 393 days.

(21) Appl. No.: 13/080,612

(22) Filed: Apr. 5, 2011

(65) Prior Publication Data

US 2012/0236446 A1  Sep. 20, 2012

(51) Int. Cl.
*H05K 9/00* (2006.01)

(52) U.S. Cl.
USPC .......................................... 361/816; 361/799

(58) Field of Classification Search
USPC ................. 361/807, 809, 810, 816, 818, 799, 361/681–683; 174/35 R, 51, 377
See application file for complete search history.

(56) References Cited

U.S. PATENT DOCUMENTS

| | | | | |
|---|---|---|---|---|
| 5,099,396 A | * | 3/1992 | Barz et al. | 361/818 |
| 6,002,582 A | * | 12/1999 | Yeager et al. | 361/679.21 |
| 6,181,573 B1 | * | 1/2001 | Riet | 361/816 |
| 6,760,083 B2 | * | 7/2004 | Lai | 349/58 |
| 7,651,062 B2 | * | 1/2010 | Matsutani et al. | 248/176.3 |
| 7,864,263 B2 | * | 1/2011 | Kim | 349/58 |
| 2012/0230002 A1 | * | 9/2012 | Qiu et al. | 361/809 |

* cited by examiner

*Primary Examiner* — Hung S Bui
(74) *Attorney, Agent, or Firm* — Altis Law Group, Inc.

(57) ABSTRACT

An exemplary display unit includes a rear cover, a bracket disposed on the rear cover, a display mounted on the bracket, and a front cover secured to the rear cover to sandwich the display and the bracket between the front cover and the rear cover. The bracket includes a plate supporting the display, a pair of bulges protruding upwardly from two opposite sides of the plate and a pair of tabs extending upwardly from the bulges, respectively. The pair of tabs press against two opposite lateral faces of the display to dissipate static electricity on the display to ground.

14 Claims, 5 Drawing Sheets

ND HAVING ANTI-EMI
DISPLAY UNIT HAVING ANTI-EMI CAPABILITY

BACKGROUND

1. Technical Field

The present disclosure relates to a display unit, and more particularly, to a display unit having good anti-electromagnetic interference (anti-EMI) capability.

2. Description of Related Art

Display systems play important roles in people's daily lives, showing images and text for various purposes. A typical display system includes a display and an enclosure accommodating the display. The display is driven by a driving module to show required images or text. Generally, in order to prevent EMI from affecting normal operation of the display, the driving module is grounded. The grounding path allows removal of static electricity generated on the display to ground. However, the driving frequency of modern driving modules is high, and the static electricity discharging capability of the driving module may be insufficient. That is, the grounding path provided by the driving module alone may be unable to provide satisfactory discharging of accumulated static electricity.

What is needed, therefore, is a display unit which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
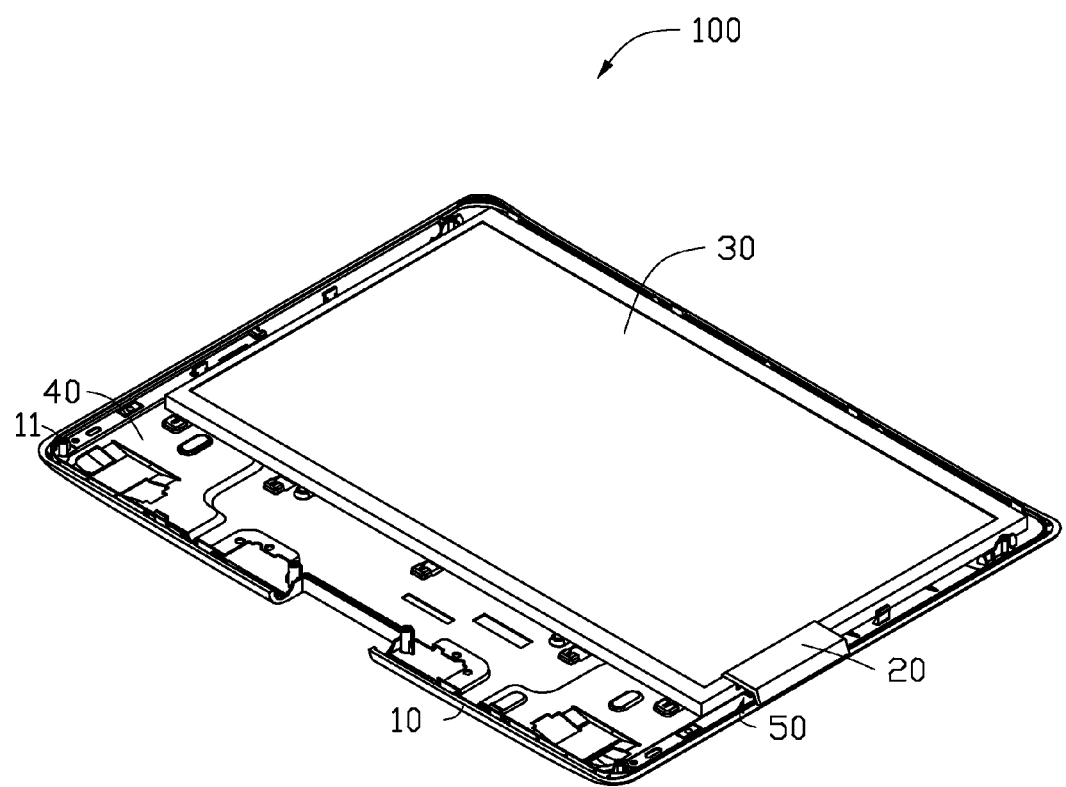
FIG. 1 is an isometric, assembled view of a display unit in accordance with an embodiment of the present disclosure, wherein most of a front cover of the display unit is removed for clarity.
Figure 2:
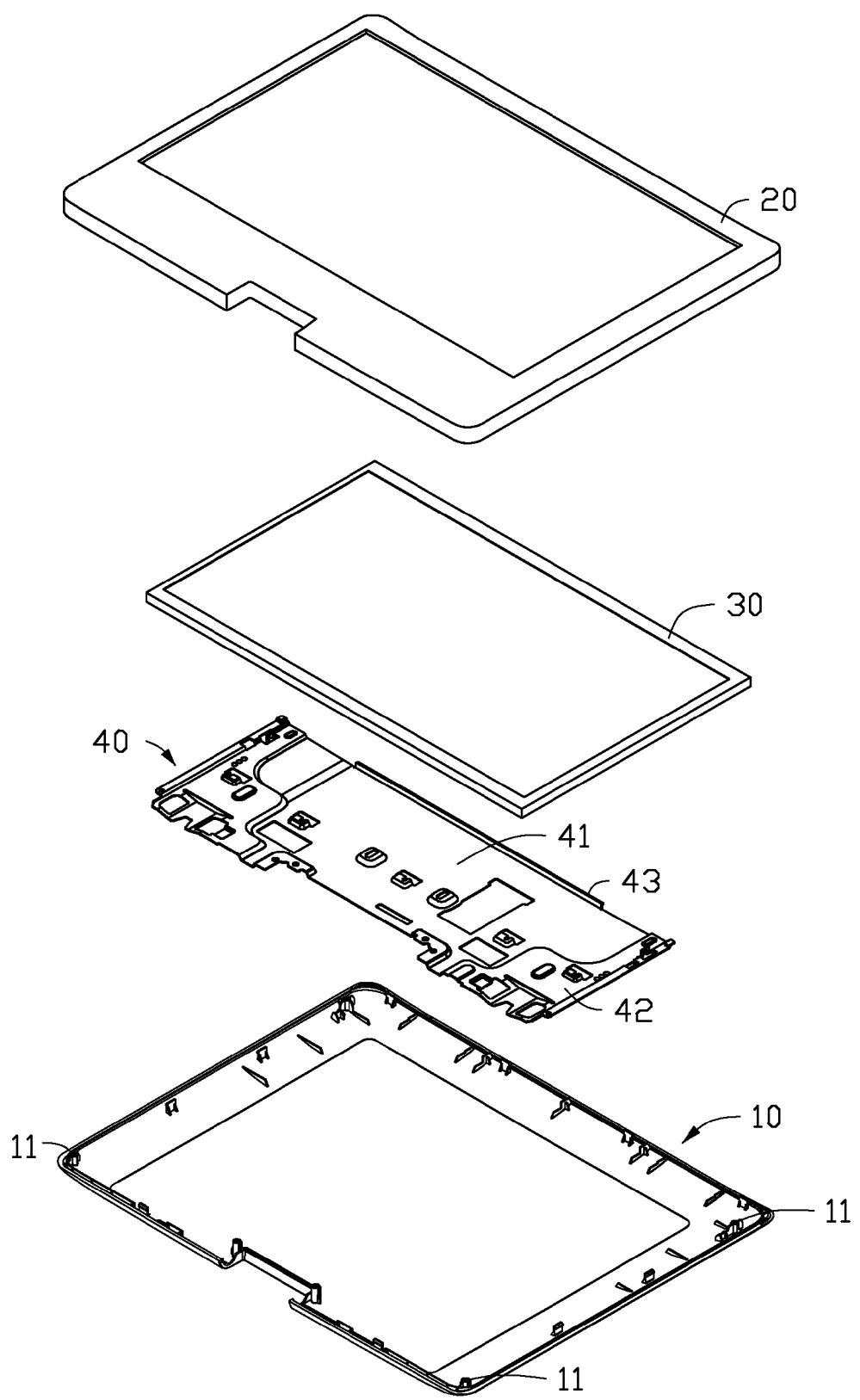
FIG. 2 is an exploded view of the display unit of FIG. 1, wherein the front cover is fully presented.

Referring to FIGS. 1-2, a display unit 100 in accordance with an embodiment of the present disclosure is shown. The display unit 100 includes a front cover 20, a rear cover 10, and a bracket 40 and a display 30 sandwiched between the front cover 20 and the rear cover 10.

The rear cover 10 is made of plastic material having good strength. The rear cover 10 forms a plurality of fasteners 11 on an inner surface thereof. The fasteners 11 can be locked with corresponding structures of the bracket 40 and the front cover 20 to fix the bracket 40 and the front cover 20 on the rear cover 10.

The front cover 20 is also made of plastic material having good strength. The front cover 20 has a size similar to that of the rear cover 10. The front cover 20 defines a large window in a central area thereof.

The display 30 is disposed on the bracket 40 and fixed between the front cover 20 and the rear cover 10. The display 30 may be a liquid crystal display, an organic light emitting diode display, or another type of display. Typically, the display 30 includes a casing made of electrically conductive material such as metal. The display 30 is exposed at the window of the front cover 20, showing images or text to viewers outside the display unit 100.

Figure 3:
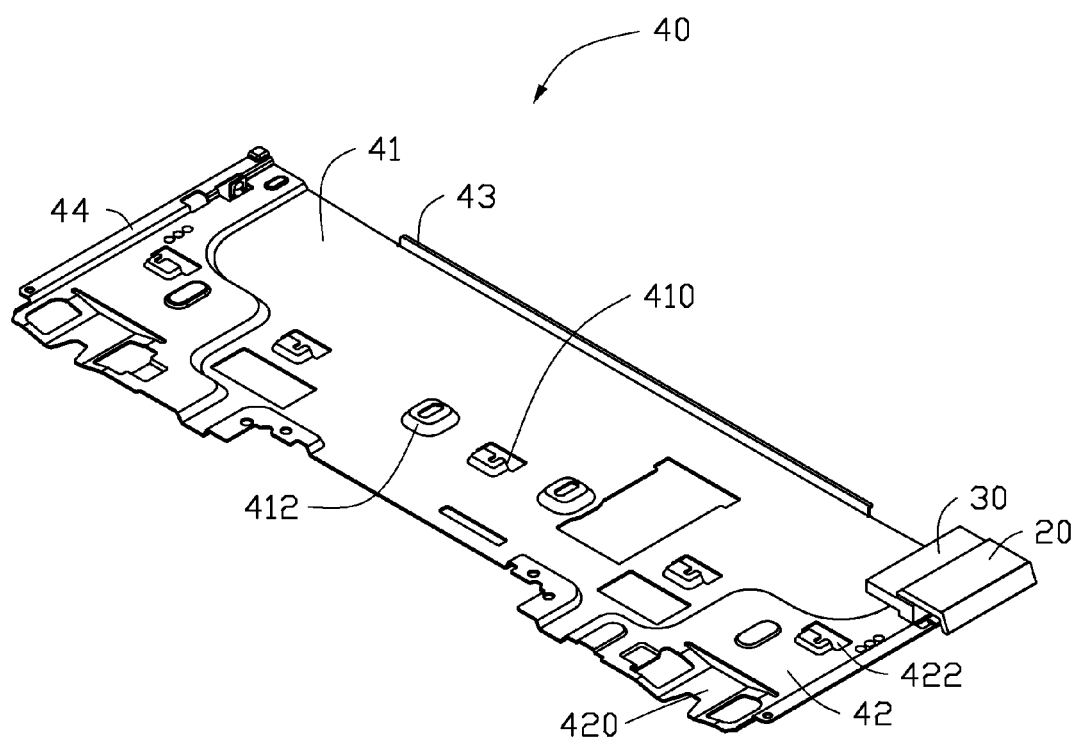
FIG. 3 shows a bracket of the display unit of FIG. 2, wherein a part of the front cover and a part of a display of the display unit are shown mounted on the bracket.
Figure 4:
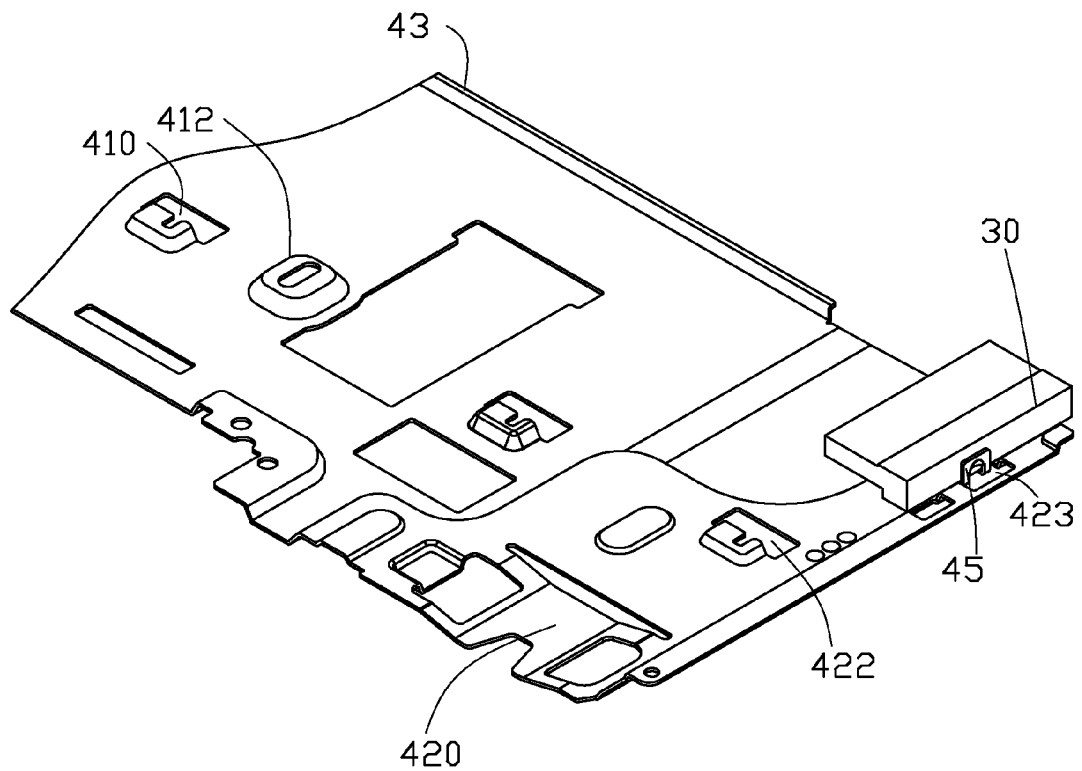
FIG. 4 is an enlarged view of half of the bracket of FIG. 3, wherein the front cover is fully removed and the part of the display remains.
Figure 5:
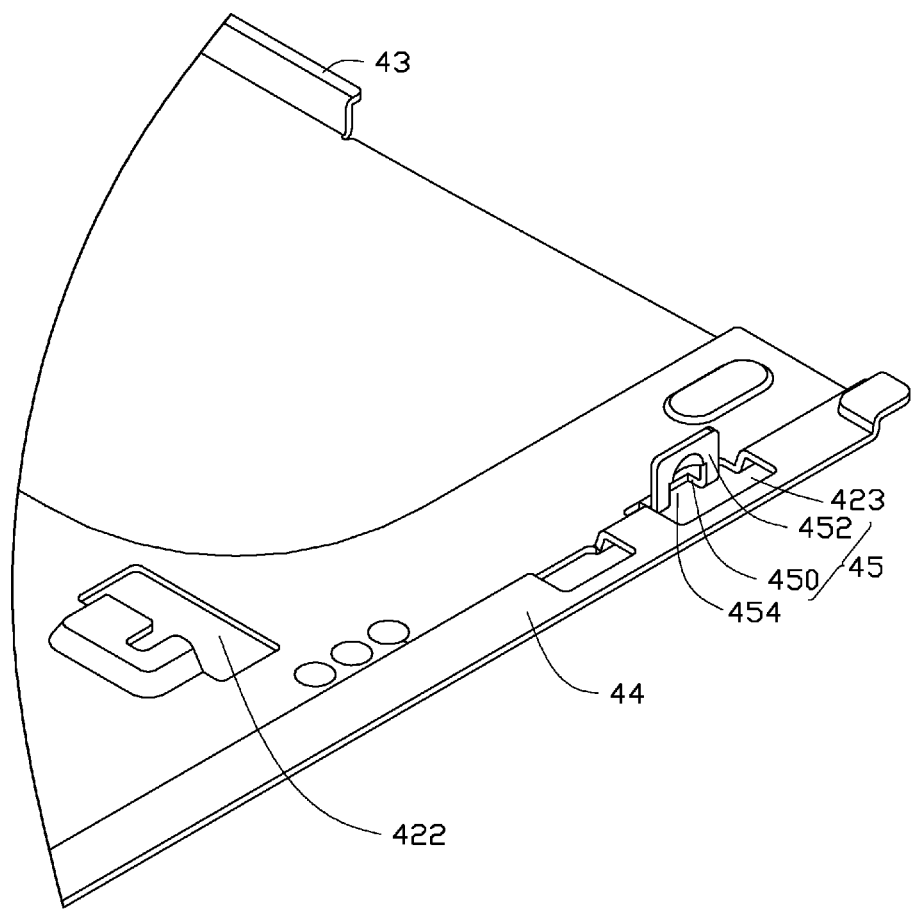
FIG. 5 is an enlarged view of a part of the bracket of the display unit of FIG. 2.

Also referring to FIGS. 3-5, the bracket 40 is disposed on the rear cover 10 and grounded via a wire (not shown). The bracket 40 is made by punching a single piece of metal sheet. The bracket 40 includes a rectangular plate 41, a pair of bulges 42 protruding upwardly from two opposite sides of the plate 41, and a flange 43 extending upwardly from a long edge of the plate 41. The plate 41 has a hole 410 defined at a central area thereof for allowing wires (not shown) to extend through the bracket 40. A pair of protrusions 412 are formed upwardly from the plate 41, at two opposite sides of the hole 410, respectively. The protrusions 412 can press against a back face of the display 30 to support the display 30 on the rear cover 10. The flange 43 is perpendicular to the plate 41. The flange 43 can increase a strength of the plate 41 so that the plate 41 is difficult to bend. The plate 41 and each bulge 42 have an irregular boundary formed therebetween. Each bulge 42 has a depression 420 and a hole 422. The hole 422 is used for extension of wires (not shown) through the bulge 42 to connect the display 30. The depression 420 is used for receiving a speaker (not shown) therein.

Each bulge 42 further forms a hem 44 extending upwardly and then horizontally from an edge thereof. The hem 44 is perpendicular to the flange 43, and located adjacent to the corresponding depression 420 and the corresponding hole 422. An opening 423 is defined in a boundary area where the bulge 42 and the hem 44 meet. That is, the opening 423 spans across a part of the bulge 42 and an adjacent part of the hem 44. A tab 45 is extended from an inner edge of the bulge 42, such inner edge defining one boundary of the opening 423. The tab 45 includes a pair of feet 450 extending horizontally and outwardly from the inner edge of the bulge 42, and a head 452 extending upwardly from and interconnecting two ends of the feet 450. The tab 45 has an aperture 454 defined therein. The aperture 454 spaces the feet 450 from each other, and also extends into the head 452. The head 452 has a height larger than that of the hem 44, so that the head 452 protrudes up beyond a top face of the hem 44. The head 452 presses against a lateral face of the display 30 to thereby allow static electricity generated on the lateral face of the display 30 to dissipate the ground. Thus, any electromagnetic interference associated with static electricity affecting the display 30 can be effectively prevented. The aperture 454 can facilitate a resilience of the tab 45, whereby the tab 45 is more elastically deformable. The tab 45 has an interference fit level of about 0.1 mm or less with the display 30 when the tab 45 presses against the lateral face of the display 30. However, such interference fit level is relatively small, whereby assembly of the display 30 on the bracket 40 can still be readily performed.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:
1. A display unit comprising:
a rear cover;

a bracket disposed on the rear cover, the bracket made of electrically conductive material and being adapted to be connected to ground;

a display disposed on the bracket, a lateral face of the display comprising electrically conductive material; and a front cover fixed to the rear cover to cover a periphery of the display;

wherein the bracket comprises a tab extending upwardly towards the front cover, the tab being elastically deformable and resiliently pressing against the lateral face of the display to provide a path for static electricity on the display to dissipate to ground;

wherein the bracket further comprises a plate pressing against a back face of the display, the tab being electrically connected to the plate;

wherein the bracket further comprises a bulge connecting the tab with the plate, the bulge protruding upwardly from a side of the plate; and wherein the tab comprises a pair of feet extending outwardly from the bulge and a head extending upwardly from the pair of feet, the head being in contact with the lateral face of the display.

2. The display unit of claim 1, wherein the plate comprises at least one protrusion in contact with the back face of the display.

3. The display unit of claim 1, wherein the bracket further comprises a flange extending upwardly and substantially perpendicularly from an edge of the plate.

4. The display unit of claim 1, wherein the tab has an aperture defined therein, and the aperture is located between the pair of feet and also within the head.

5. The display unit of claim 1, wherein the head has an interference fit level of no more than approximately 0.1 mm with the lateral face of the display.

6. The display unit of claim 1, wherein the bracket further comprises a hem extending upwardly and then outwardly from a side of the bulge.

7. The display unit of claim 6, wherein the head of the tab extends up beyond a top face of the hem.

8. The display unit of claim 6, wherein an opening is defined in a boundary region where the hem and the bulge meet, the tab being provided in the opening.

9. The display unit of claim 1, wherein the bracket is made of a single piece of metal sheet.

10. A display unit comprising:

a rear cover;

a display, a lateral side of the display comprising electrically conductive material;

a metal bracket placed on the rear cover, the bracket adapted to be connected to ground, the bracket comprising a plate supporting the display on the rear cover, a bulge protruding upwardly from a side of the plate, and tab extending upwardly from the bulge, the tab being in contact with and resiliently urging the lateral side of the display; and a front cover fixed to the rear cover and framing the display;

wherein the bracket comprises a hem extending upwardly and outwardly from a side of the bulge, an opening being defined in a boundary where the bulge and the hem meet, and the tab being received in the opening.

11. The display unit of claim 10, wherein the tab comprises a pair of feet extending outwardly from the bulge and a head extending upwardly from the pair of feet, the head being in contact with the lateral side of the display.

12. The display unit of claim 11, wherein the head has a height larger than that of the hem so that the head protrudes upwardly beyond a top face of the hem.

13. The display unit of claim 12, wherein an aperture is defined in the tab, the aperture having a part to space the pair of feet from each other and another part terminated within the head.

14. The display unit of claim 10, wherein the tab is elastically deformable.

* * * * *